(12) United States Patent
Yushin et al.

(10) Patent No.: US 12,068,474 B2
(45) Date of Patent: *Aug. 20, 2024

(54) PROTECTION OF BATTERY ELECTRODES AGAINST SIDE REACTIONS

(71) Applicant: Sila Nanotechnologies Inc., Alameda, CA (US)

(72) Inventors: Gleb Yushin, Atlanta, GA (US); Bogdan Zdyrko, Atlanta, GA (US); Eugene Berdichevsky, Alameda, CA (US); Alexander Jacobs, Atlanta, GA (US); Alper Nese, Alameda, CA (US); Adam Kajdos, Stockton, CA (US); Justin Yen, Alameda, CA (US); Justin Doane, Alameda, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,022

(22) Filed: Oct. 15, 2021

(65) Prior Publication Data

US 2022/0037645 A1    Feb. 3, 2022

Related U.S. Application Data

(63) Continuation of application No. 16/679,199, filed on Nov. 9, 2019, now Pat. No. 11,158,848, which is a (Continued)

(51) Int. Cl.
*H01M 4/00*      (2006.01)
*H01M 4/36*      (2006.01)
(Continued)

(52) U.S. Cl.
CPC ............. *H01M 4/364* (2013.01); *H01M 4/38* (2013.01); *H01M 4/386* (2013.01); *H01M 4/387* (2013.01);
(Continued)

(58) Field of Classification Search
CPC ........ H01M 4/364; H01M 4/38; H01M 4/386; H01M 4/387; H01M 4/5815; H01M 4/582; H01M 4/628; H01M 4/463
See application file for complete search history.

(56) References Cited

U.S. PATENT DOCUMENTS 2,881,100 A * 4/1959 Hardman .............. C25B 11/044
427/113
9,202,631 B2 * 12/2015 Wakizaka ........... H01M 50/461
(Continued)

FOREIGN PATENT DOCUMENTS

CN      104521036 A      4/2015
WO    WO 2009/123168    * 10/2009 .............. H01M 2/16

*Primary Examiner* — Raymond Alejandro
(74) *Attorney, Agent, or Firm* — MUNCY, GEISSLER, OLDS & LOWE, P.C.; Daniel Podhajny

(57) ABSTRACT

A battery electrode composition is provided that comprises composite particles. Each of the composite particles in the composition (which may represent all or a portion of a larger composition) may comprise a porous electrode particle and a filler material. The porous electrode particle may comprise active material provided to store and release ions during battery operation. The filler material may occupy at least a portion of the pores of the electrode particle. The filler material may be liquid and not substantially conductive with respect to electron transport.

18 Claims, 11 Drawing Sheets

Related U.S. Application Data continuation of application No. 15/286,480, filed on Oct. 5, 2016, now Pat. No. 10,476,071.

(60) Provisional application No. 62/237,351, filed on Oct. 5, 2015.

(51) Int. Cl.
*H01M 4/38* (2006.01)
*H01M 4/46* (2006.01)
*H01M 4/58* (2010.01)
*H01M 4/62* (2006.01)

(52) U.S. Cl.
CPC ......... *H01M 4/463* (2013.01); *H01M 4/5815* (2013.01); *H01M 4/582* (2013.01); *H01M 4/628* (2013.01)

(56) References Cited

U.S. PATENT DOCUMENTS

| | | | |
|---|---|---|---|
| 9,728,809 B2 * | 8/2017 | Inagaki | H01M 4/485 |
| 10,476,071 B2 * | 11/2019 | Yushin | H01M 4/38 |
| 11,158,848 B2 * | 10/2021 | Yushin | H01M 4/5815 |

* cited by examiner

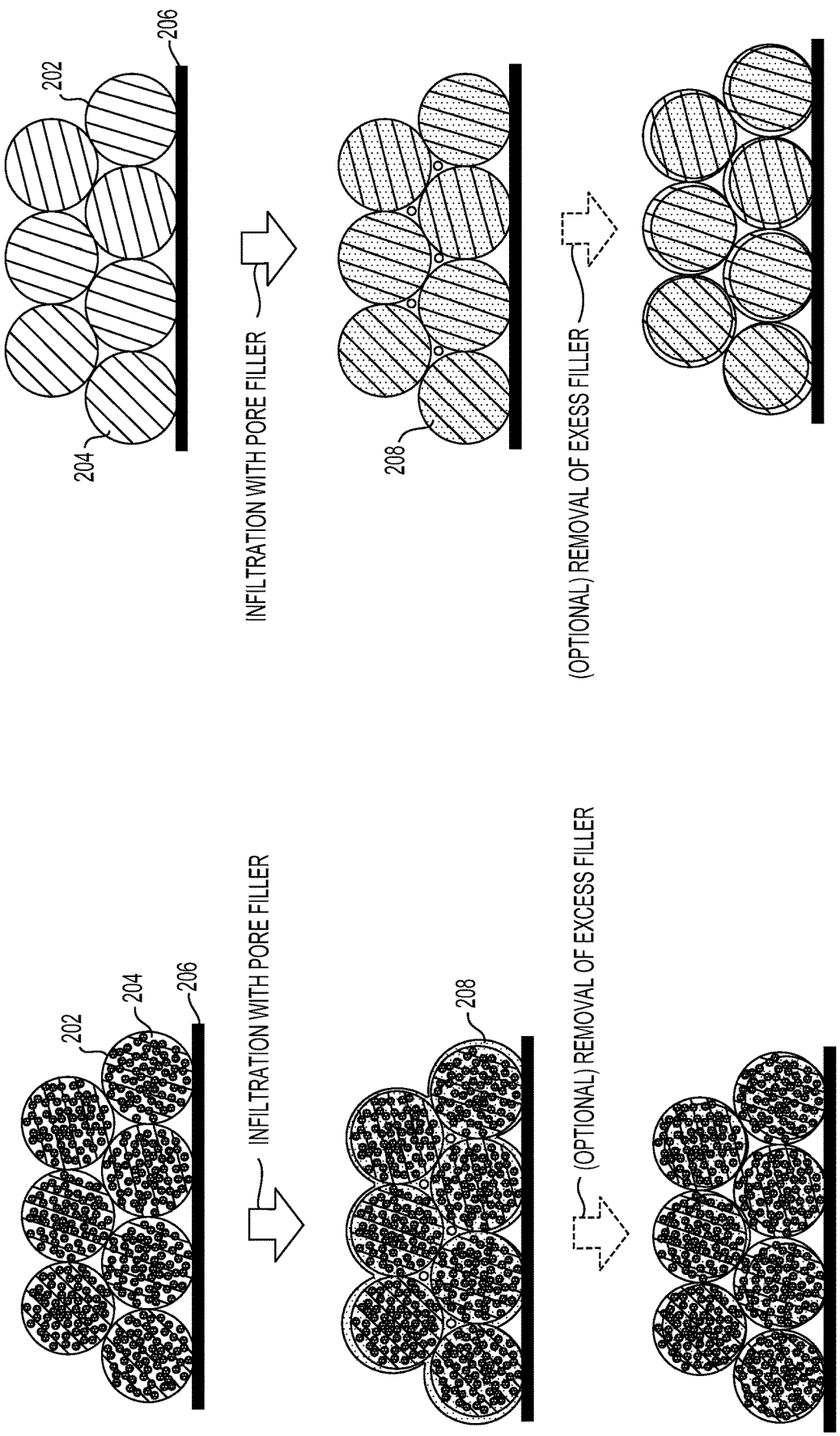

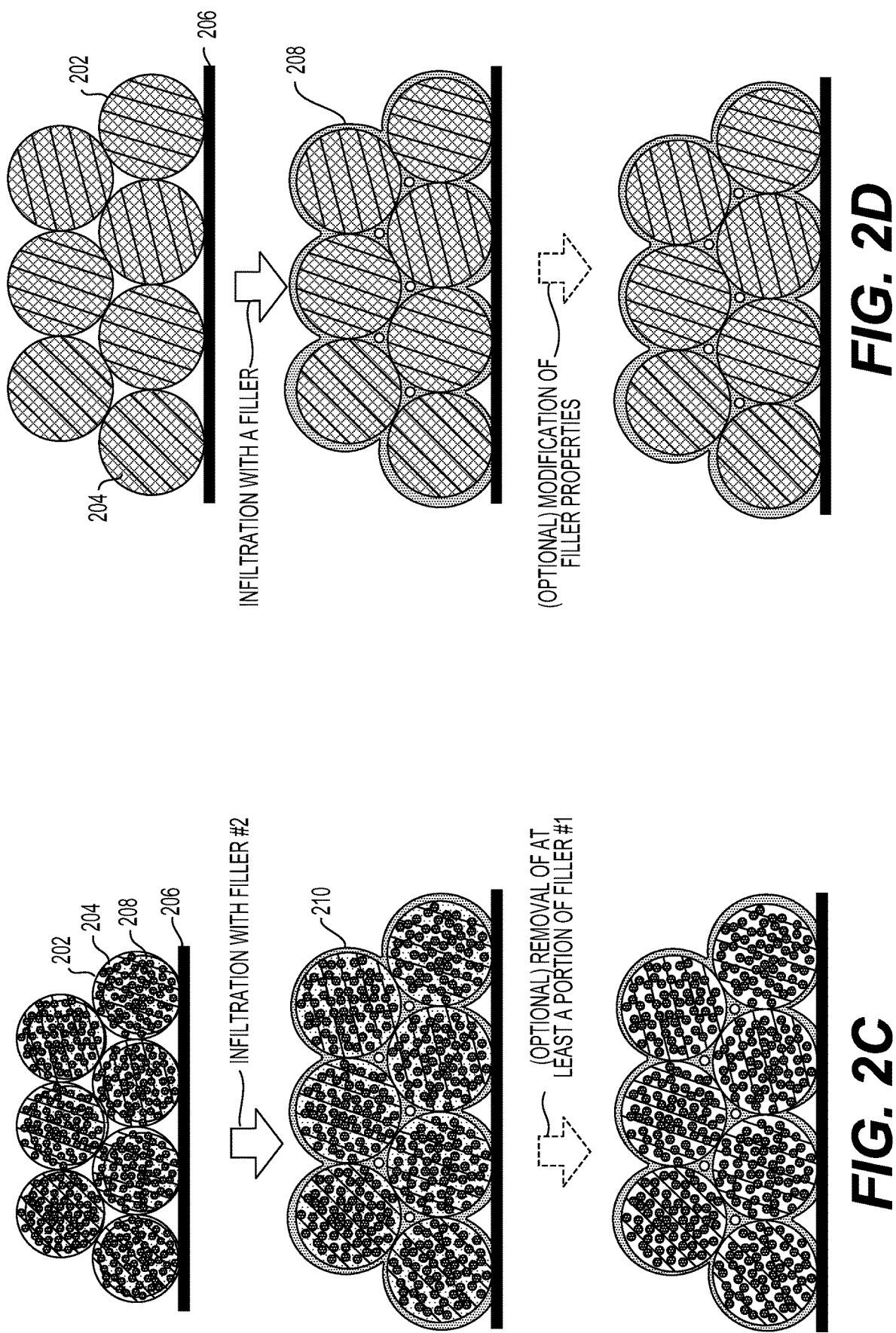

| C NUMBER | MOLECULAR FORMULA | NAME OF UNBRANCHED COMPOUND |
|---|---|---|
| 4 | $C_4H_{10}$ | n-BUTANE |
| 5 | $C_5H_{12}$ | n-PENTANE |
| 6 | $C_6H_{14}$ | n-HEXANE |
| 7 | $C_7H_{16}$ | n-HEPTANE |
| 8 | $C_8H_{18}$ | n-OCTANE |
| 9 | $C_9H_{20}$ | n-NONTANE |
| 10 | $C_{10}H_{22}$ | n-DECANE |
| 11 | $C_{11}H_{24}$ | n-UNDECANE |
| 12 | $C_{12}H_{26}$ | n-DODECANE |
| 13 | $C_{13}H_{28}$ | n-TRIDECANE |
| 14 | $C_{14}H_{30}$ | n-TETRADECANE |
| 15 | $C_{15}H_{32}$ | n-PENTADECANE |
| 16 | $C_{16}H_{34}$ | n-HEXADECANE |
| 17 | $C_{17}H_{36}$ | n-HEPTADECANE |
| 18 | $C_{18}H_{38}$ | n-OCTADECANE |
| 19 | $C_{19}H_{40}$ | n-NONADECANE |
| 20 | $C_{20}H_{42}$ | n-EICOSANE |
| 21 | $C_{21}H_{44}$ | n-HENEICOSANE |
| 22 | $C_{22}H_{46}$ | n-DOCOSANE |
| 23 | $C_{23}H_{48}$ | n-TRICOSANE |
| 24 | $C_{24}H_{50}$ | n-TETRACOSANE |
| 25 | $C_{25}H_{52}$ | n-PENTACOSANE |
| 26 | $C_{26}H_{54}$ | n-HEXACOSANE |
| 27 | $C_{27}H_{56}$ | n-HEPTACOSANE |
| 28 | $C_{28}H_{58}$ | n-OCTACOSANE |
| 29 | $C_{29}H_{60}$ | n-NONACOSANE |
| 30 | $C_{30}H_{62}$ | n-TRIACONTANE |
| 31 | $C_{31}H_{64}$ | n-HENTRIACONTANE |
| 32 | $C_{32}H_{66}$ | n-DOTRIACONTANE |
| 33 | $C_{33}H_{68}$ | n-TRITRIACONTANE |
| 34 | $C_{34}H_{70}$ | n-TETRATRIACONTANE |
| 35 | $C_{35}H_{72}$ | n-PENTATRIACONTANE |
| 36 | $C_{36}H_{74}$ | n-HEXATRIACONTANE |
| 37 | $C_{37}H_{76}$ | n-HEPTATRIACONTANE |
| 38 | $C_{38}H_{78}$ | n-OCTATRIACONTANE |
| 39 | $C_{39}H_{80}$ | n-NONATRIACONTANE |
| 40 | $C_{40}H_{82}$ | n-TETRACONTANE |

FIG. 3A

| C NUMBER | MOLECULAR FORMULA | NAME OF UNBRANCHED COMPOUND |
|---|---|---|
| 41 | $C_{41}H_{84}$ | n-HENTETRACONTANE |
| 42 | $C_{42}H_{86}$ | n-DOTETRACONTANE |
| 43 | $C_{43}H_{88}$ | n-TRITETRACONTANE |
| 44 | $C_{44}H_{90}$ | n-TETRATETRACONTANE |
| 45 | $C_{45}H_{92}$ | n-PENTATETRACONTANE |
| 46 | $C_{46}H_{94}$ | n-HEXATETRACONTANE |
| 47 | $C_{47}H_{96}$ | n-HEPTATETRACONTANE |
| 48 | $C_{48}H_{98}$ | n-OCTATETRACONTANE |
| 49 | $C_{49}H_{100}$ | n-NONATETRACONTANE |
| 50 | $C_{50}H_{102}$ | n-PENTACONTANE |
| 51 | $C_{51}H_{104}$ | n-HENPENTACONTANE |
| 52 | $C_{52}H_{106}$ | n-DOPENTACONTANE |
| 53 | $C_{53}H_{108}$ | n-TRIPENTACONTANE |
| 54 | $C_{54}H_{110}$ | n-TETRAPENTACONTANE |
| 55 | $C_{55}H_{112}$ | n-PENTAPENTACONTANE |
| 56 | $C_{56}H_{114}$ | n-HEXAPENTACONTANE |
| 57 | $C_{57}H_{116}$ | n-HEPTAPENTACONTANE |
| 58 | $C_{58}H_{118}$ | n-OCTAPENTACONTANE |
| 59 | $C_{59}H_{120}$ | n-NONAPENTACONTANE |
| 60 | $C_{60}H_{122}$ | n-HEXACONTANE |
| 61 | $C_{61}H_{124}$ | n-HENHEXACONTANE |
| 62 | $C_{62}H_{126}$ | n-DOHEXACONTANE |
| 63 | $C_{63}H_{128}$ | n-TRIHEXACONTANE |
| 64 | $C_{64}H_{130}$ | n-TETRAHEXACONTANE |
| 65 | $C_{65}H_{132}$ | n-PENTAHEXACONTANE |
| 66 | $C_{66}H_{134}$ | n-HEXAHEXACONTANE |
| 67 | $C_{67}H_{136}$ | n-HEPTAHEXACONTANE |
| 68 | $C_{68}H_{138}$ | n-OCTAHEXACONTANE |
| 69 | $C_{69}H_{140}$ | n-NONAHEXACONTANE |
| 70 | $C_{70}H_{142}$ | n-HEPTACONTANE |
| 71 | $C_{71}H_{144}$ | n-HENHEPTACONTANE |
| 72 | $C_{72}H_{146}$ | n-DOHEPTACONTANE |
| 73 | $C_{73}H_{148}$ | n-TRIHEPTACONTANE |
| 74 | $C_{74}H_{150}$ | n-TETRAHEPTACONTANE |
| 75 | $C_{75}H_{152}$ | n-PENTAHEPTACONTANE |
| 76 | $C_{76}H_{154}$ | n-HEXAHEPTACONTANE |
| 77 | $C_{77}H_{156}$ | n-HEPTAHEPTACONTANE |
| 78 | $C_{78}H_{158}$ | n-OCTAHEPTACONTANE |
| 79 | $C_{79}H_{160}$ | n-NONAHEPTACONTANE |
| 80 | $C_{80}H_{162}$ | n-OCTACONTANE |

FIG. 3B

| C NUMBER | MOLECULAR FORMULA | NAME OF UNBRANCHED COMPOUND |
|---|---|---|
| 81 | $C_{81}H_{164}$ | N-HENOCTACONTANE |
| 82 | $C_{82}H_{166}$ | N-DOOCTACONTANE |
| 83 | $C_{83}H_{168}$ | N-TRIOCTACONTANE |
| 84 | $C_{84}H_{170}$ | N-TETRAOCTACONTANE |
| 85 | $C_{85}H_{172}$ | N-PENTAOCTACONTANE |
| 86 | $C_{86}H_{174}$ | N-HEXAOCTACONTANE |
| 87 | $C_{87}H_{176}$ | N-HEPTAOCTACONTANE |
| 88 | $C_{88}H_{178}$ | N-OCTAOCTACONTANE |
| 89 | $C_{89}H_{180}$ | N-NONAOCTACONTANE |
| 90 | $C_{90}H_{182}$ | N-NONACONTANE |
| 91 | $C_{91}H_{184}$ | N-HENNONACONTANE |
| 92 | $C_{92}H_{186}$ | N-DONONACONTANE |
| 93 | $C_{93}H_{188}$ | N-TRINONACONTANE |
| 94 | $C_{94}H_{190}$ | N-TETRANONACONTANE |
| 95 | $C_{95}H_{192}$ | N-PENTANONACONTANE |
| 96 | $C_{96}H_{194}$ | N-HEXANONACONTANE |
| 97 | $C_{97}H_{196}$ | N-HEPTANONACONTANE |
| 98 | $C_{98}H_{198}$ | N-OCTANONACONTANE |
| 99 | $C_{99}H_{200}$ | N-NONANONACONTANE |
| 100 | $C_{100}H_{202}$ | N-HECTANE |
| 101 | $C_{101}H_{204}$ | N-HENIHECTANE |
| 102 | $C_{102}H_{206}$ | N-DOHECTANE |
| 103 | $C_{103}H_{208}$ | N-TRIHECTANE |
| 104 | $C_{104}H_{210}$ | N-TETRAHECTANE |
| 105 | $C_{105}H_{212}$ | N-PENTAHECTANE |
| 106 | $C_{106}H_{214}$ | N-HEXAHECTANE |
| 107 | $C_{107}H_{216}$ | N-HEPTAHECTANE |
| 108 | $C_{108}H_{218}$ | N-OCTAHECTANE |
| 109 | $C_{109}H_{220}$ | N-NONAHECTANE |
| 110 | $C_{110}H_{222}$ | N-DECAHECTANE |
| 111 | $C_{111}H_{224}$ | N-UNDECAHECTANE |
| 112 | $C_{112}H_{226}$ | N-DODECAHECTANE |
| 113 | $C_{113}H_{228}$ | N-TRIDECAHECTANE |
| 114 | $C_{114}H_{230}$ | N-TETRADECAHECTANE |
| 115 | $C_{115}H_{232}$ | N-PENTADECAHECTANE |
| 116 | $C_{116}H_{234}$ | N-HEXADECAHECTANE |
| 117 | $C_{117}H_{236}$ | N-HEPTADECAHECTANE |
| 118 | $C_{118}H_{238}$ | N-OCTADECAHECTANE |
| 119 | $C_{119}H_{240}$ | N-NONADECAHECTANE |
| 120 | $C_{120}H_{242}$ | N-ICOSAHECTANE |

*FIG. 3C*

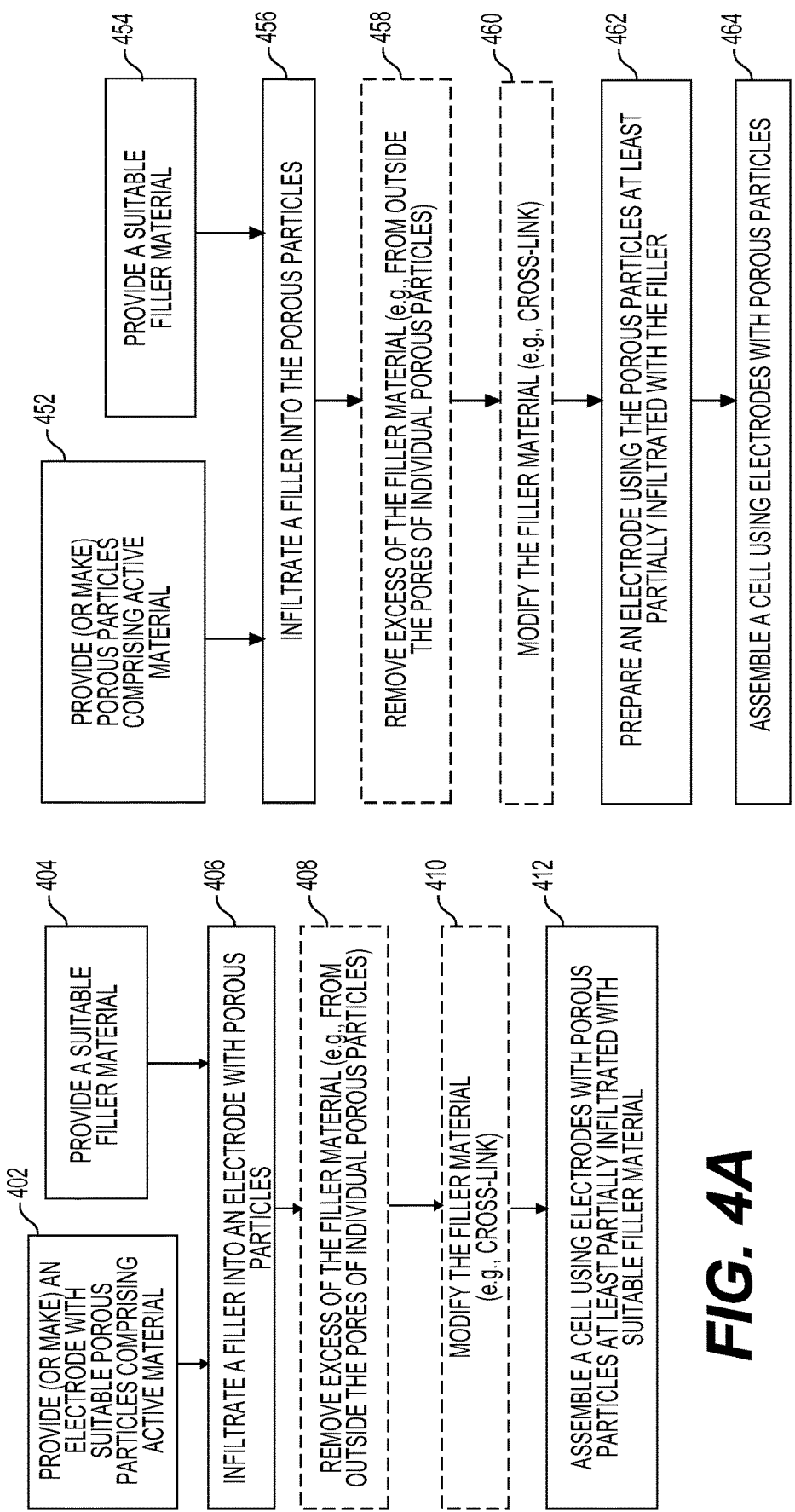

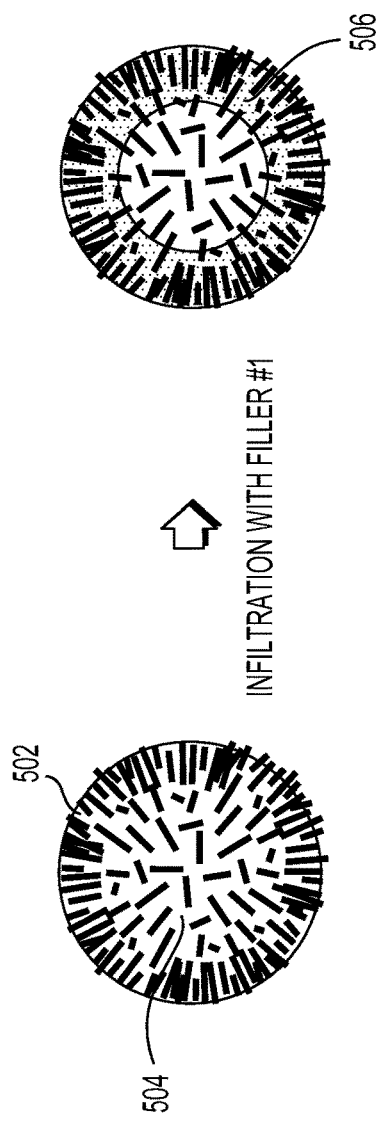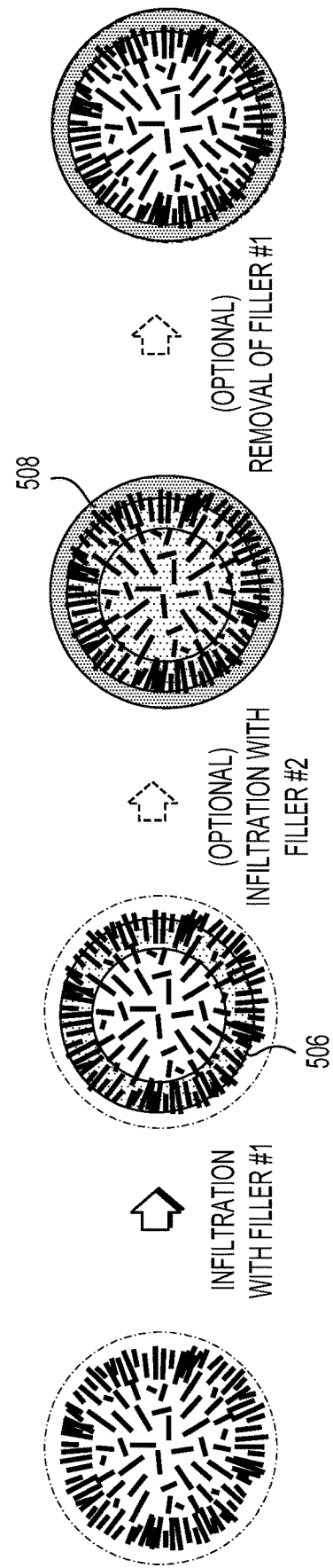

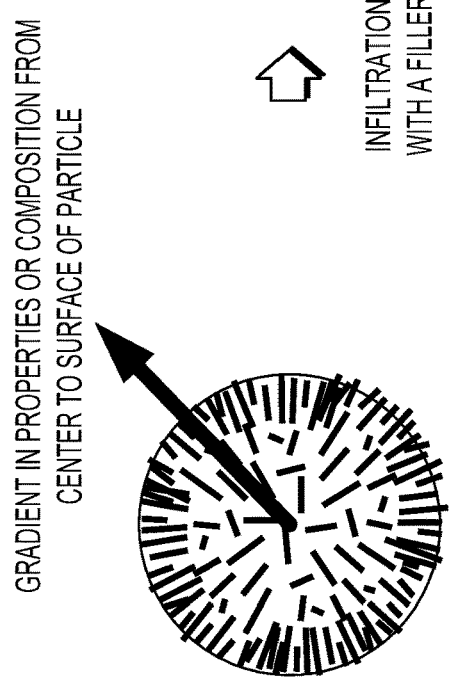
GRADIENT IN PROPERTIES OR COMPOSITION FROM CENTER TO SURFACE OF PARTICLE
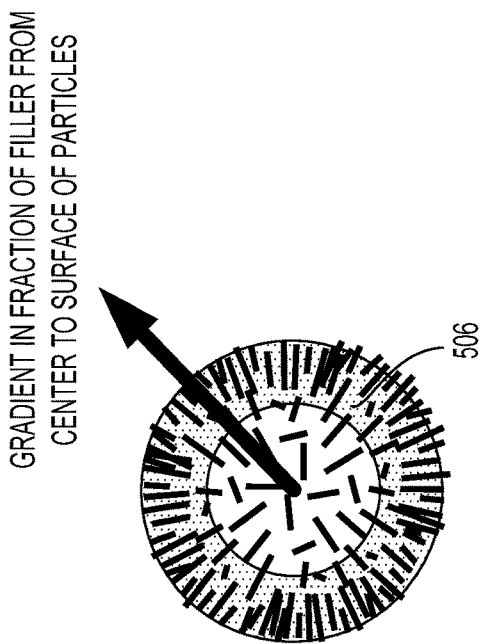
GRADIENT IN FRACTION OF FILLER FROM CENTER TO SURFACE OF PARTICLES
⇧ INFILTRATION WITH A FILLER
*FIG. 5C*
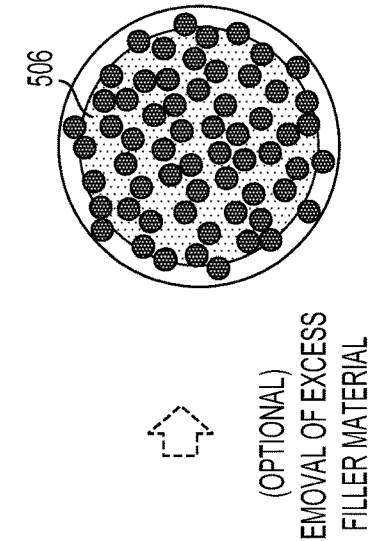
⇧ (OPTIONAL) REMOVAL OF EXCESS FILLER MATERIAL
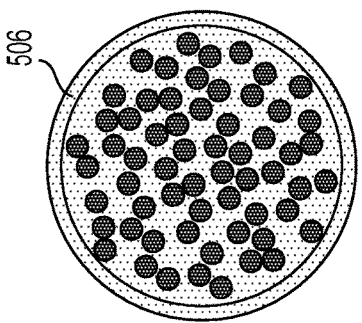
⇧ INFILTRATION WITH A FILLER
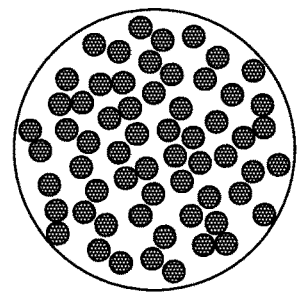
*FIG. 5D*

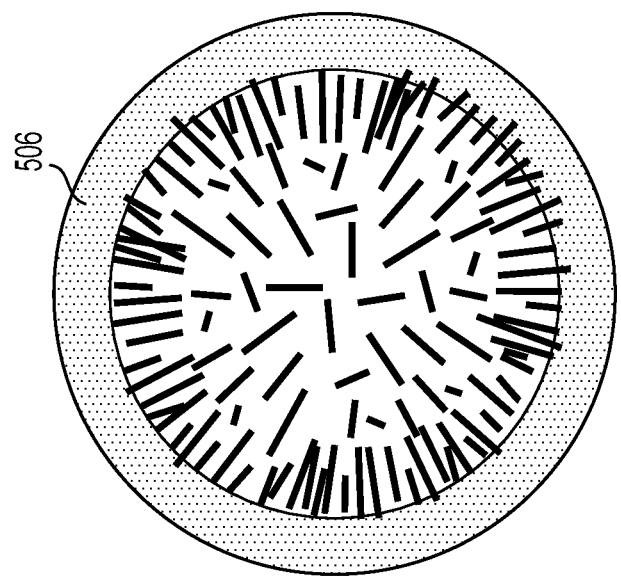
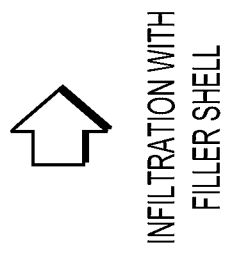
INFILTRATION WITH FILLER SHELL
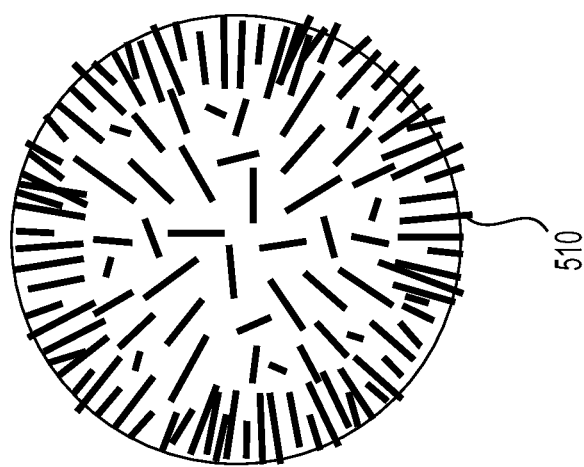
*FIG. 5E*

PROTECTION OF BATTERY ELECTRODES AGAINST SIDE REACTIONS

CLAIM OF PRIORITY UNDER 35 U.S.C. § 119

The present application for patent is a Continuation of U.S. patent application Ser. No. 16/679,199, entitled "Protection of Battery Electrodes against Side Reactions" filed Nov. 9, 2019 and issued as U.S. Pat. No. 11,158,848 on Oct. 26, 2021, which is a Continuation of U.S. patent application Ser. No. 15/286,480 entitled "Protection of Battery Electrodes against Side Reactions" filed Oct. 5, 2016 and issued as U.S. Pat. No. 10,476,071 on Nov. 12, 2019, which claims the benefit of U.S. Provisional Application No. 62/237,351, entitled "Protection of Porous Battery Electrodes against Side Reactions with Electrolytes," filed Oct. 5, 2015, each of which is expressly incorporated herein by reference in its entirety.

GOVERNMENT LICENSE RIGHTS

This invention was made with government support under Award ID DE-AR0000265 awarded by the Advanced Research Projects Agency-Energy (ARPA-E) within the United States Department of Energy (DOE). The government has certain rights in the invention.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for potential applications in low- or zero-emission, hybrid-electrical or fully-electrical vehicles, consumer electronics, energy-efficient cargo ships and locomotives, aerospace applications, and power grids. In particular, further improvements are desired for various rechargeable batteries, such as rechargeable metal and metal-ion batteries (such as rechargeable Li and Li-ion batteries, rechargeable Na and Na-ion batteries, rechargeable Mg and Mg-ion batteries, etc.), rechargeable alkaline batteries, rechargeable metal hydride batteries, and lead acid batteries, to name a few.

In many different types of rechargeable batteries, active (charge storing) materials may be produced as high surface area porous structures or porous composites, where pores are exposed to electrolyte during battery operation. In some cases, formation of these pores may be desired in order to accommodate volume changes during battery operation or in order to reduce ion diffusion distances or electron diffusion distances. Examples of materials that exhibit volume changes include so-called conversion-type and so-called alloying-type electrode materials. In the case of metal-ion batteries (such as Li-ion batteries), examples of such conversion-type electrode materials include, but are not limited to, metal fluorides (such as lithium fluoride, iron fluoride, cupper fluoride, bismuth fluorides, etc.), metal chlorides, metal iodides, metal chalcogenides (such as sulfides), sulfur, oxides, metal nitrides, metal phosphides, metal hydrides, and others. In the case of metal-ion batteries (such as Li-ion batteries), examples of such alloying-type electrode materials include, but are not limited to, silicon, germanium, antimony, aluminum, magnesium, zinc, gallium, arsenic, phosphorous, silver, gold, cadmium, indium, tin, lead, bismuth, their alloys, and others. These materials often offer higher gravimetric and volumetric capacity than so-called intercalation electrodes used in commercial Li-ion batteries. Conversion-type electrodes are also commonly used in various aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, metal hydrides, to name a few.

In some cases, active materials that exhibit minimal volume changes during battery operation (for example, so-called intercalation materials, which are used in Li-ion batteries, such as lithium titanate or titanium oxide anode materials or lithium cobalt oxide, lithium nickel cobalt manganese oxide, lithium cobalt aluminum oxide, lithium manganese oxide and various other layered, spinel, olivine and tavorite-structured and other Li intercalation compounds, to name a few) may also be produced as porous particles or porous composite particles (e.g., as composites comprising these active materials and conductive carbon or another material) in order to improve their rate performance in batteries.

While high specific surface area or porosity in the active material particles may be advantageous for improving some of the performance characteristics of electrodes comprising such particles (for example, improving stability or increasing rate performance), it may also significantly enhance the degree of undesirable reactions with the electrolyte. Such undesirable reactions may include, for example, active material dissolution; electrolyte decomposition with the formation of, for example, undesirable gaseous, solid, or liquid products; so-called ion shuttle; and the irreversible loss of active ions (such as the loss of Li in the case of Li-ion batteries), to name a few. These undesirable reactions may lead to self-discharge, an increase in cell resistance, a reduction in accessible power, reduction in accessible energy, or the gradual loss of capacity. The high surface area of active materials may also significantly increase safety hazards associated with these batteries.

Accordingly, there remains a need for improved batteries, components, and other related materials and manufacturing processes.

SUMMARY

Embodiments disclosed herein address the above stated needs by providing improved battery components, improved batteries made therefrom, and methods of making and using the same.

A battery electrode composition is provided that comprises composite particles. Each of the composite particles in the composition (which may represent all or a portion of a larger composition) may comprise a porous electrode particle and a filler material. The porous electrode particle may comprise active material provided to store and release ions during battery operation. The filler material may occupy at least a portion of the pores of the electrode particle. The filler material may be liquid and not substantially conductive with respect to electron transport.

As an example, the filler material may have an electrical conductivity less than $10^{-6}$ S/cm.

In some designs, the active material may be an alloying-type anode material. The alloying-type anode material may comprise, for example, silicon, tin, antimony, phosphorous, or aluminum. In other designs, the active material may be a conversion-type cathode material. The conversion-type cathode material may comprise, for example, a metal-fluoride-based material or a metal-sulfide-based material.

For at least a portion of the porous electrode particles, the active material may be porous. In addition or as an alternative, for at least a portion of the porous electrode particles, the active material may be non-porous and the porous electrode particle may be a composite particle further comprising a porous substrate (e.g., a scaffolding matrix in which the active material is disposed).

As an example, the filler may comprise one or more oils, including one or more chemically-modified oils. As another example, the filler may comprise one or more monomers or one or more reactive oligomers.

Each composite particle may further comprise a second filler material that is solid. The filler material may also comprise a first filler material having a first average molecular weight and a second filler material having a second average molecular weight different from the first average molecular weight.

Each composite particle may have an outer region and an inner region, with the outer region having pores with a first average pore size and the inner region having pores with a second average pore size larger than the first average pore size. As an example, the first average pore size may be less than about 1 nm and the second average pore size may be greater than about 3 nm.

Each composite particle may also have an outer region and an inner region, with the inner region comprising the filler material and the outer region not comprising the filler material.

In various designs, a volume fraction of the filler material in each composite particle may change from the center to the perimeter of the particle.

A battery is also provided that comprises anode and cathode electrodes, an electrolyte, and a separator. At least one of the electrodes may comprise a battery electrode composition as described herein. The electrolyte may ionically couple the anode and the cathode electrodes. The separator may electrically separate the anode and the cathode electrodes.

A method of fabricating a battery electrode composition comprising composite particles is also provided. The method may comprise, for example, forming porous electrode particles that each comprise active material provided to store and release ions during battery operation, and infiltrating, into the porous electrode particles, a filler material occupying at least a portion of the pores of each electrode particle, with the filler material being liquid and not substantially conductive with respect to electron transport.

BRIEF DESCRIPTION OF THE DRAWINGS

The accompanying drawings are presented to aid in the description of embodiments of the invention and are provided solely for illustration of the embodiments and not limitation thereof.

FIGS. 2A-2D are graphical flow diagrams illustrating example methods of fabricating filler-comprising electrodes.

FIGS. 3A-3C show examples of suitable alkanes that may be used as filler material(s) or part of filler material(s).

FIGS. 4A-4C are flow charts showing examples of suitable methods for the fabrication of an electrochemical energy storage device.

FIGS. 5A-5E are graphical flow diagrams illustrating example particle designs and infiltrations with suitable fillers.

DETAILED DESCRIPTION

Figure 1:
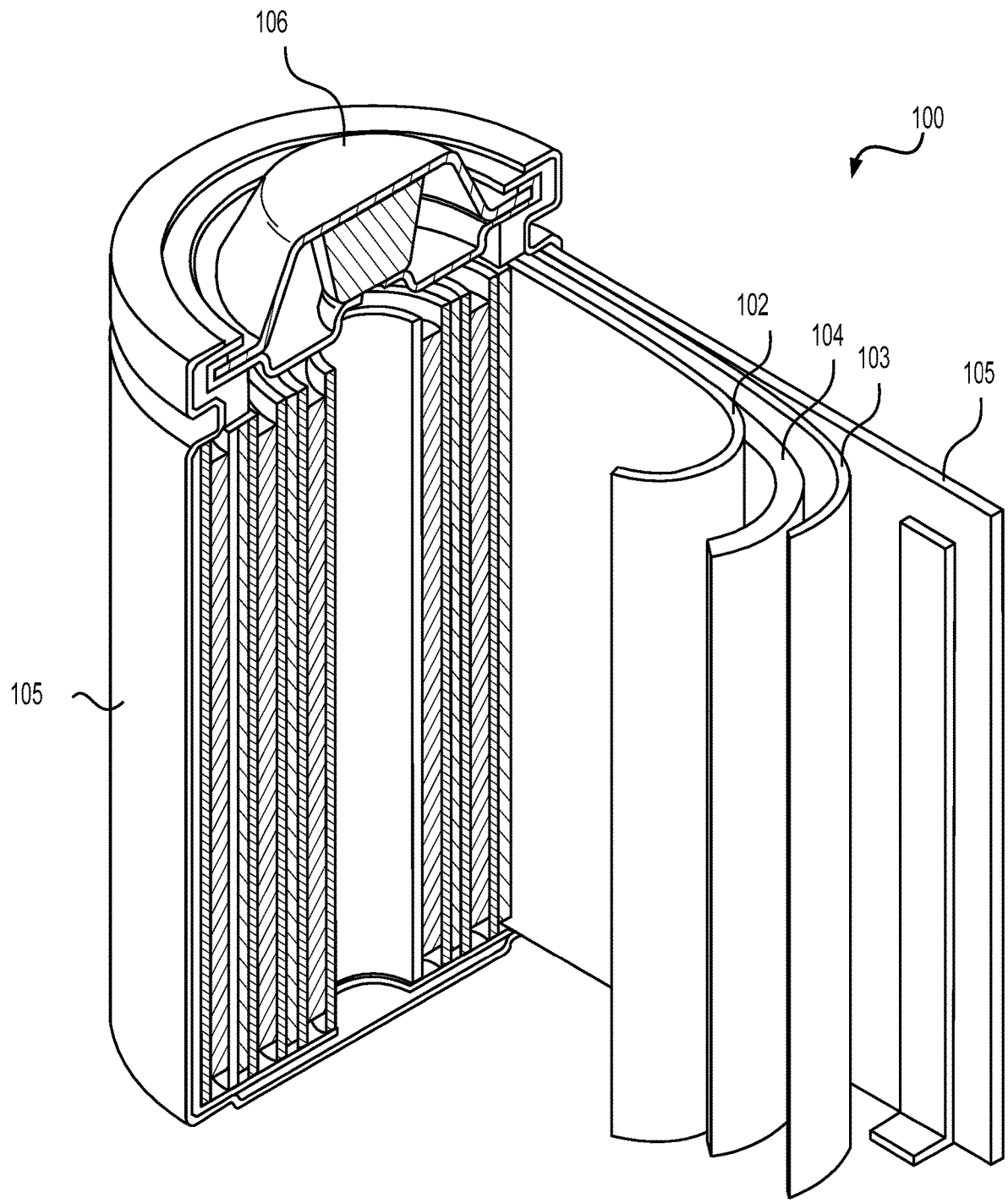
FIG. 1 illustrates an example (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary, metal and metal-ion batteries (such as Na-ion, Mg-ion, K-ion, Ca-ion, Al-ion, and others). Further, while the description below may also describe certain examples of the material formulations in a Li-free state, it will be appreciated that various aspects may be applicable to Li-containing electrodes (for example, lithiated Si anodes, lithiated metal fluorides, or $Li_2S$, in either a partially or fully discharged state).

While the description below may describe certain examples in the context of some specific alloying-type and conversion-type chemistries of anode and cathode active materials for Li-ion batteries (such as silicon-comprising anodes or metal fluoride-comprising or metal sulfide-comprising cathodes), it will be appreciated that various aspects may be applicable to other chemistries for Li-ion batteries (other conversion-type and alloying-type electrodes as well as various intercalation-type electrodes) as well as to other battery chemistries. In the case of metal-ion batteries (such as Li-ion batteries), examples of other suitable conversion-type electrodes include, but are not limited to, metal chlorides, metal iodides, sulfur, selenium, metal oxides, metal nitrides, metal phosphides, metal hydrides, and others. During battery operation, conversion materials change (convert) from one crystal structure to another (hence the name "conversion"-type). In the case of metal-ion batteries (such as Li-ion batteries), examples of other alloying-type active materials include, but are not limited to, germanium, antimony, aluminum, magnesium, zinc, gallium, arsenic, phosphorous, silver, gold, cadmium, indium, tin, lead, bismuth, their alloys, their alloys with silicon, their alloys with each other and other elements, and others. During battery operation, Li ions are inserted into alloying type materials forming lithium alloys (hence the name "alloying"-type).

In the case of metal-ion batteries (such as Li-ion batteries), examples of intercalation-type active materials include, but are not limited to, various layered materials (such as lithium titanium sulfide (LTS), lithium cobalt oxide (LCO), lithium nickel oxide (LNO), various lithium manganese oxides (LMO), various lithium nickel cobalt manganese oxides (NCM), lithium nickel cobalt aluminum oxide (NCA), etc.), various spinel structure materials (such as spinel LMO, spinel LCO, lithium titanate (LTO), etc.), various metal oxides (such as various manganese oxides, various titanium oxides, various iron oxides, various molybdenum oxides, etc.), various olivine structure materials (such as lithium iron phosphate (LFP), lithium manganese phosphate (LMP), lithium cobalt phosphate (LCP), lithium nickel phosphate (LNP), etc.), various tavorite structure materials (such as various polyannion compounds, for example, those with the formulas $Li_xM1_yM2_{1-y}(XO_4)F$; $Li_xM1_yM2_{1-y}(XO_4)OH$; or $Li_xM1_yM2_{1-y}(YO_3)(XO_4)$, where x=from 1 to 3; y=from 0 to 1; M1 and M2 are redox active transition metals (such as V, Fe, Ni, Co, Mo, Mn, and others); X=P, Si, or As; Y=C or B; as well as many others), and various other intercalation-type active materials (such as other polyanions of triplite or other structures, etc.), to name a few common examples. During a battery operation, Li ions are intercalated into and occupy the interstitial positions of such materials (hence the name "intercalation"-type materials).

While the description below may describe certain examples in the context of metal-ion batteries, other conversion-type electrodes that may benefit from the present disclosure include various chemistries used in a broad range of aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

While the description below may also describe the protection of porous particles against undesirable side reactions with the electrolyte, it will be appreciated that similar approaches may also be utilized to protect these particles against undesirable side reactions in other environments (e.g., in air during electrode assembling or in water or another solvent during electrode slurry formulations).

While the description generally focuses on electrodes composed of individual particles, it will be appreciated that similar approaches may also be utilized on solid bulk electrodes.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown) impregnating the separator 104, a battery case 105, and a sealing member 106 sealing the battery case 105.

Both liquid and solid electrolytes may be used for the designs herein. Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of organic solvents (such as a mixture of carbonates). Other common organic solvents include nitriles, esters, sulfones, sulfoxides, phosphorous-based solvents, silicon-based solvents, ethers, and others. The solvents may be modified (e.g., sulfonated or fluorinated). The electrolytes may also comprise ionic liquids (—such as neutral ionic liquids in some designs or acidic and basic ionic liquids in other designs).

In the case of aqueous Li-ion (or aqueous Na-ion, K-ion, Ca-ion, etc.) batteries, electrolytes typically include an aqueous solution of inorganic Li (or Na, K, Ca, etc.) salts (such as $Li_2SO_4$, $LiNO_3$, $LiCl$, $LiBr$, $Li_3PO_4$, $H_2LiO_4P$, $C_2F_3LiO_2$, $C_2F_3LiO_3S$, $Na_2O_3Se$, $Na_2SO_4$, $Na_2O_7Si_3$, $Na_3O_9P_3$, $C_2F_3NaO_2$ etc.). These electrolytes may also include an aqueous solution of organic Li (or Na) salts, various salt mixtures (including a salt of non-Li metals and semimetals), and, in some cases, hydroxide(s) (such as LiOH, NaOH, KOH, $Ca(OH)_2$, etc.), and, in some cases, acids (including organic acids). In some designs, such aqueous electrolytes may also comprise neutral, acidic, or basic ionic liquids (from approximately 0.00001 wt. % to approximately 40 wt. % relative to the total weight of electrolyte). In some designs, such "aqueous" (or water-containing) electrolytes may also comprise organic solvents (from approximately 0.00001 wt. % to approximately 40 wt. % relative to the total weight of electrolyte), in addition to water. Illustrative examples of suitable organic solvents may include carbonates (e.g., propylene carbonate, ethylene carbonate, diethyl carbonate, dimethyl carbonate, ethyl methyl carbonate, fluoriethylene carbonate, vinylene carbonate, others), various nitriles (e.g., acetonitrile, etc.), various esters, various sulfones (e.g., propane sulfone, etc.), various sultones, various sulfoxides, various phosphorous-based solvents, various silicon-based solvents, various ethers, and others.

The most common salt used in a Li-ion battery electrolyte, for example, is $LiPF_6$, while less common salts include lithium tetrafluoroborate ($LiBF_4$), lithium perchlorate ($LiClO_4$), lithium bis(oxalato)borate ($LiB(C_2O_4)_2$), lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$, or $CF_3SO_2N^-(Li^+)SO_2PhCF_3$, and others), and others. Electrolytes for Mg-ion, K-ion, Ca-ion, and Al-ion batteries are often more exotic as these batteries are in earlier stages of development. They may comprise different salts and solvents (in some cases, ionic liquids may replace organic solvents for certain applications).

Some electrolytes in aqueous batteries (such as alkaline batteries, including nickel-metal hydride batteries) may comprise an alkaline solution (for example, a mixture of KOH and LiOH solutions). Some electrolytes in aqueous batteries (such as lead acid batteries) may comprise an acidic aqueous solution (for example, $H_2SO_4$ aqueous solution). Some electrolytes in aqueous batteries may comprise an organic solvent as an additive. Some electrolytes in aqueous batteries may comprise two or more organic solvent(s) or ionic liquid(s) as additive(s).

Conventional cathode materials utilized in Li-ion batteries are of an intercalation-type. Metal ions are intercalated into and occupy the interstitial positions of such materials during the charge or discharge of a battery. However, such cathodes exhibit relatively small gravimetric and volumetric capacities (typically less than 220 mAh/g and less than 1000 mAh/cm$^3$, respectively) and often suffer from relatively slow Li-ion mobility and relatively small electrical conductivity. Formation of porous intercalation-type materials may facilitate increased power performance of Li-ion batteries due to the reduction in the ion diffusion distance within smaller crystalline grains or due to the reduction in the electron diffusion distance (e.g., if the surface of such materials is coated with an electrically conductive material). Similarly, embedding intercalation-type materials into a conductive porous material (such as porous carbon) or forming porous composite materials comprising an intercalation-type material and another conductive material (such as electrically conductive carbon) offer a route to increase rate performance of Li-ion batteries. Characteristic pore dimensions in the range from 0.4 nm to 200 nm, or more preferably from 0.4 nm to 20 nm, or even more preferably from 0.4 nm to 10 nm, may be particularly useful in the context of the present disclosure.

Unfortunately, the high surface area of the porous materials in contact with the electrolyte may lead to a significantly increased degree or rate of various undesirable side reactions. Examples of such undesirable reactions may include, but are not limited to, electrolyte decomposition (for example, electrolyte oxidation—typically on the surface of a cathode; or electrolyte reduction—most typically on the surface of an anode, but occasionally observed on the surface of a cathode), irreversible losses of Li (for example, during Li salt decomposition and the formation of the so-called solid electrolyte interphase (SEI) layer on the anode), dissolution of at least a portion of an active material (for example, dissolution of transition metals in lithium metal oxide-based electrodes), and generation of gases (for example, generation of $O_2$, CO, and $CO_2$—typically on the cathode), to name a few. Such side reactions may reduce the useable energy and reduce the cycle life of Li-ion batteries comprising these high surface area electrodes. For example, formation of high surface area porous graphite anodes may induce formation of a larger total volume of the SEI on its larger surface when compared to nonporous graphite particles, thereby irreversibly consuming more Li from the system (the SEI comprises a high Li content) and reducing the energy density of the corresponding cell. In another example, formation of high surface area NCM cathodes may induce faster surface reactions with the electrolyte, including dissolution of Mn (and to a lesser extent, Co and Ni) from the surface. These transition metals may diffuse to the anode and induce damages within the anode SEI (such as a graphite SEI), and thus may induce further SEI growth, leading to faster impedance growth and larger irreversible consumption of Li (and overall faster cell degradation). In yet another example, formation of high surface area LTO-C porous nanocomposite anodes or $TiO_2$—C porous nanocomposite anodes may induce faster electrolyte decomposition (particularly at elevated temperatures of 40-90° C.), inducing undesirable formation of solid or gaseous electrolyte decomposition products, thus similarly inducing impedance growth and cell degradation. In addition, the use of high surface area active materials may reduce the safety characteristics of Li-ion batteries.

Alloying-type anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. In fact, electronic and ionic conductivity of Si is lower than that of graphite. Formation of porous Si-comprising particles (including, but not limited to, porous Si, porous Si—C composites, porous Si-metal composites, porous Si-polymer composites, or other types of porous composites comprising nanostructured Si or nanostructured or nano-sized Si particles of various shapes and forms) may reduce volume changes during Li-ion insertion and extraction, which, in turn, may lead to better cycle stability in rechargeable Li-ion cells. Similarly, formation of porous Si-comprising particles (including, but not limited to, porous Si, porous Si—C composites, porous Si-metal composites, porous Si-polymer (nano)composites, porous Si—C-polymer-metal (nano)composites, or other types of porous composites comprising nanostructured Si or nanostructured or nano-sized Si particles of various shapes and forms) may allow an increase in the rate performance of Si-based anode materials (and thus may allow formation of higher power cells). Other alloying-type anode materials suffer from similar limitations, but may similarly offer faster rate performance and reduced volume changes (and thus may exhibit better stability) when used in the form of porous particles or porous composite particles. Conversion-type anode materials (such as oxides, for example) exhibit similar trends.

Unfortunately, the high surface area of porous alloying-type anode materials (or porous composites that comprise alloying-type anode materials or conversion-type anode materials) may lead to a significant increase in formation cycle losses (at least in the initial 1-100 cycles) due to the SEI formation on their high inner surface area in contact with the electrolyte. These irreversible losses of Li result in the reduction of the accessible energy density of Li-ion batteries.

Conversion-type cathode materials for rechargeable Li-ion or Li batteries may offer higher energy density, higher specific energy, or higher specific or volumetric capacities compared to intercalation-type cathode materials.

For example, fluoride-based cathodes may offer outstanding technological potential due to their very high capacities, in some cases exceeding 300 mAh/g (greater than 1200 mAh/cm³ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). In a fully lithiated state, metal fluorides covert to a composite comprising a mixture of metal and LiF clusters (or nanoparticles). Examples of the overall reversible reactions of the conversion-type metal fluoride cathodes may include $2Li+CuF_2 \leftrightarrow 2LiF+Cu$ for $CuF_2$-based cathodes or $3Li+FeF_3 \leftrightarrow 3LiF+Fe$ for $FeF_3$-based cathodes). It will be appreciated that metal fluoride-based cathodes may be prepared in both Li-free or partially lithiated or fully lithiated states.

Unfortunately, metal fluorides with a high theoretical capacity and high theoretical energy density may suffer from a lack of stability and large polarization, as experimentally observed. In contrast to the small structural, chemical, and volumetric differences observed during insertion/extraction of Li ions into/out of intercalation cathode compounds (where Li is inserted/intercalated into the interstitials of the intercalation crystals), fluorides exhibit dramatic structural changes and significant volume changes accompanying cell cycling. The conventional fluoride cathodes may also suffer from other limitations, such as (i) low electrical conductivity; (ii) low ionic conductivity; (iii) gas generation during fluoride reactions with electrolytes (particularly at high potentials), which may cause battery degradation; (iv) formation of surface species during surface reactions with the electrolyte, which may increase resistance and reduce the reversibility of electrochemical reactions; (v) oxidation of metals and dissolution of the metal and metal fluorides during cycling, which may increase resistance, damage the SEI layer on the anode, and reduce both the power performance and cycle stability of battery cells; (vi) irreversible changes within their structure during battery operation (such as irreversible growth of the LiF and metal clusters/nanoparticles), which may also lead to irreversible resistance growth capacity losses.

Formation and use of porous metal fluorides or (preferably) porous metal fluoride-comprising cathode particles in cells may overcome some of the above limitations. For example, they may offer reduced voltage hysteresis, improved capacity utilization, improved rate performance, improved mechanical and sometimes improved electrochemical stability, reduced volume changes, and other positive attributes. Examples of such porous cathode materials include, but are not limited to, porous LiF—Cu—Fe—C nanocomposites, porous $FeF_2$—C nanocomposites, porous $FeF_3$—C nanocomposites, porous $CuF_2$—C nanocomposites, porous LiF—Cu—C nanocomposites, porous LiF—Cu—C-polymer nanocomposites, porous LiF—Cu-metal-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, or $ZnF_2$, or other metal fluorides or their mixtures. In some examples, metal fluoride nanoparticles may be infiltrated into the pores of porous carbon (for example, into the pores of activated carbon particles) to form these porous metal-fluoride-C nanocomposites.

Unfortunately, the high surface area and the porosity of porous metal fluoride-comprising cathode particles may induce decomposition of the electrolyte and the resulting irreversible losses of Li, or may (in some cases) induce faster dissolution of the active material (metals or metal fluorides) during cycling. The high surface area of porous metal fluoride-comprising cathode particles may also lead to a higher degree of side reactions (for example, a higher degree of oxidation of metals (in the case of lithiated metal fluorides) or an undesirable interaction between LiF or other metal fluorides with CO, $CO_2$, or moisture during electrode or battery assembling or during battery cycling).

Another example of a promising conversion-type cathode (or, in some cases, anode) material is sulfur (S) (in a Li-free state) or lithium sulfide ($Li_2S$, in a fully lithiated state). In order to reduce dissolution of active material during cycling, improve electrical conductivity, or improve mechanical stability of $S/Li_2S$ electrodes, the formation of porous S, porous $Li_2S$, porous S—C composites, porous $Li_2S$—C composites, porous S-polymer composites, or other porous composites comprising S or $Li_2S$ may be utilized.

Unfortunately, the high surface area of the S ($Li_2S$)/electrolyte contact may induce undesirably fast side reactions, such as undesirably fast polysulfide dissolution or undesirably large electrolyte decomposition and the irreversible loss of available Li, to name a few.

In aqueous batteries, in many instances it is similarly advantageous to produce and use porous electrode particles in order to enhance their rate characteristics. In particular, in some cases it may be advantageous to utilize porous composites. In some cases such composites may comprise conductive carbon. Illustrative examples of such porous composites include porous metal-carbon (nano)composite particles (for example, porous Fe—C, porous Zn—C, porous Cd—C, porous Pb—C, and other (nano)composites comprising metals), porous metal oxide-carbon (nano)composites (such as porous $Fe_3O_4$—C, porous $Fe_2O_3$—C, porous ZnO—C, porous CdO—C, porous PbO—C, porous $PbO_2$—C, porous $Pb_2O_3$—C, porous $MnO_2$—C, porous molybdenum oxide-carbon, porous $TiO_2$—C, porous NCM-C, porous LTS-C, porous LMO-C, porous LTO-C, porous LTS-C, and other (nano)composites comprising metal oxides as conversion-type or intercalation-type active materials), porous metal hydroxide-carbon composites (such as porous $Ni(OH)_2$—C, porous $Fe(OH)_3$—C, porous $Fe(OH)_2$—C, porous $Zn(OH)_2$—C, porous $Cd(OH)_2$—C, and other (nano)composites comprising metal hydroxides), various porous metal sulfide-carbon (nano)composites, various porous metal hydride-carbon (nano)composites and other porous (nano)composites comprising metal hydrides, porous metal oxyhydroxide-carbon (nano)composites (such as porous NiOOH—C, FeOOH—C, and other porous (nano)composites comprising metal oxyhydroxides), to name a few.

Unfortunately, the high surface area of such porous composites and the small size of the corresponding metal, metal oxide, metal hydroxide, metal sulfide, metal hydride, and metal oxyhydroxide active materials may lead to faster dissolution and re-precipitation of the active material. In addition, it may also lead to faster electrolyte decomposition—for example, to significantly stronger water decomposition with hydrogen generation on the anode. Generation of $H_2$ gas may not only induce a safety hazard and limit access of the electrolyte to the active material, but also consume charging current, prevent re-charging of the aqueous cell to full capacity, reduce energy density, and lead to other undesirable effects. Similarly, cathode materials used in aqueous batteries (particularly high surface area ones—e.g., porous or those that exhibit small particle size) may suffer from excessive oxygen evolution (generation of $O_2$ gas). As a result, porous composite particles comprising active materials or high surface area active particles for use in aqueous batteries may suffer from reduced performance.

The present disclosure allows one to overcome some of the above-discussed challenges of various types of porous electrode materials (for example, conversion-type, alloying-type, or intercalation-type materials) for a broad range of batteries and to produce high rate or high energy density batteries with reduced formation losses and reduced undesirable side reactions in spite of the porous nature (e.g., with a pore fraction in the range of about 2 to about 70 vol. %) and high specific surface area (e.g., in the range of about 5 to about 3000 $m^2/g$) of the porous electrode particles. A characteristic smallest pore dimensions (e.g., the width of slit-shaped pores or the diameter of cylindrical pores) of the porous electrode particles in the range of about 0.4 nm to about 200 nm may be particularly useful in the context of the present disclosure. In some cases, it may be preferred for the porous electrode particles to exhibit smaller pores, for example with most of the pore volume corresponding to pores from around 0.4 nm to around 40 nm, from around 0.4 nm to around 20 nm, from around 0.4 nm to around 10 nm, or even from around 0.4 nm to around 5 nm. In some cases, the use of suitable filler materials to coat the outer surface area of nonporous active particles (in order to prevent direct contact between at least some component of the electrolyte and active material) may also be advantageous.

FIGS. 2A-2D are graphical flow diagrams illustrating four example methods for the fabrication of battery electrodes with reduced side reactions between the active material and electrolyte. In general, each of the electrodes is formed from electrode particles 202 comprising different arrangements of active material 204. In the examples of FIGS. 2A and 2C, the electrode particles 202 are porous composite particles. In the example of FIG. 2B, the active material 204 is itself porous. In the example of FIG. 2D, the electrode particles 202 are non-porous. In any case, the particles may be cast on a current collector 206 and attached using a binder (not shown). It will be appreciated that a flat one-sided electrode is shown here for illustration purposes, but other types of arrangements, including cylindrical or curved electrodes, two-sided electrodes, electrodes with a porous current collector (e.g., a mesh) and others may also be used as desired.

As will be described in more detail below, one or more filler materials 208, 210 may be variously incorporated into each of the illustrated designs.

In the case of porous particles (as in the examples of FIGS. 2A-2C) the internal surface area of the porous particles is at least partially filled with a suitable filler material. The filling may be conducted in a solution (in a liquid phase) or from filler vapors (in a gaseous phase). The filling pressure may be atmospheric, above atmospheric, or below atmospheric (e.g., vacuum). The temperature of the filling process may also be different, depending on the particular chemistry of the filler and the application (e.g., typically in the range of around 0° C. to around 900° C.). If needed, any excess of the filler material (e.g., from larger pores of the porous particles or from the external surface of the porous particles) may be removed (e.g., by evaporation).

Unexpectedly, the inventors have discovered that even when the electrolyte does not permeate into a significant portion of the pores of such filled particles, the surface (or interface) diffusion of ions in the filled particles may still be sufficiently fast to provide sufficiently high rate capability when the electrode is used in a cell. This is a significant change from the traditional design of porous particles in an electrode.

In some applications, the use of a filler in an electrode comprising nonporous particles (as illustrated in FIG. 2D) may also be advantageous in order to minimize undesirable side reactions with the electrolyte.

In some applications, it may be advantageous for the filler material to completely encapsulate the electrode particles (porous or not) in order to prevent direct contact with the electrolyte (as illustrated in FIGS. 2C and 2D). In some applications, the encapsulating filler material may be introduced after the initial formation of the electrode (as further illustrated in FIGS. 2C and 2D). But it will be appreciated that the introduction of the filler material may also be performed during the electrode casting (e.g., when the slurry comprises the filler material).

In some applications, it may be advantageous to modify one or more of the filler material properties (e.g., with heat-treatment—e.g., in the temperature range from around 50° C. to around 1000° C., depending on the composition of the filler—or using a chemical reaction, or both, or by other means, such as vapor deposition, etc.). This may be done in order to achieve various desirable functions (e.g., to make the filler impermeable to an unstable electrolyte component but permeable to a stable electrolyte component, or to close the pores and prevent direct contact between the active material and the unstable electrolyte component, etc.).

In some applications (e.g., when the outer surface area of the electrode particles is largely encapsulated in a filler material in such a way as to prevent most direct contact between at least some component of the electrolyte and the active material), it may be advantageous to make the filler permeable to one of the electrolyte components but impermeable to another component (e.g., be permeable to one solvent and impermeable to another). For example, if a cell electrolyte comprises more than one solvent (e.g., solvent 1 and solvent 2) and if one solvent (e.g., solvent 1) decomposes upon contact with one of the electrodes (e.g., with the anode or with the cathode) in at least some stage of cell operation (e.g., during charge) with the formation of non-passivating species (e.g., with the formation of gas(es)) while the other solvent (solvent 2) is either stable in the operable potential range or forms passivating species, the lack of permeability (e.g., the lack of swelling in the case of polymeric fillers or the lack of solubility in the case of liquid fillers, etc.) of solvent 1 into the filler material may completely prevent or drastically reduce this gas generation, while allowing ion transport through solvent 2 (e.g., when solvent 2 dissolves electrolyte salt). In one example, an aqueous electrolyte may also comprise an organic solvent and a salt that may be dissolved in both water and suitable organic solvent(s). In this case, a polymer filler may be used that is non-swellable in water (non-water absorbing, not permeable by water) but swellable in the organic solvent component of the electrolyte (e.g., carbonates, nitriles, esters, sulfones, sulfoxides, phosphorous-based solvents, silicon-based solvents, ethers, and other suitable organic solvents). Some fluorinated polymers (e.g., polyvinylidene difluoride) are illustrative examples of such polymers. By infiltrating the electrode with such a filler (or introducing a filler by other suitable methods) water decomposition (e.g., hydrogen generation on the anode or oxygen generation on the cathode) may be prevented or significantly reduced (e.g., if the filler is an insulator that does not allow electron transport). At the same time, the filler material absorbs at least a portion of the organic component of the electrolyte and thus becomes permeable to electrolyte ions (e.g., Li, Na, K, or Ca ions). This may be a more straightforward and more economical solution than the conventional formation of a coating of a solid electrolyte around the electrode particles. Although solid electrolyte coatings may be used in order to similarly prevent water (electrolyte) decomposition, a conformal, defect-free liquid electrolyte-compatible solid electrolyte coating is expensive and extremely difficult to implement.

In some applications, it may be advantageous to use more than one filler material. In some applications, it may be advantageous to remove (e.g., by evaporation or dissolution) at least one of the filler materials prior to using the corresponding electrode in a cell.

A wide range of suitable filler materials may be used. In an ideal case, the filler material should not be miscible with electrolyte solvent. However, some small miscibility (e.g., less than about 5%) may be acceptable in some applications, particularly when pores in the porous electrode particles are smaller than approximately 5 nm. In some cases (e.g., for porous anode materials used in metal-ion batteries), the filler material should not solvate electrolyte ions. In some applications of Li-ion batteries, it may be preferable for the maximum concentration of Li salts in the filler material to be below 0.1 M, or, more preferably, below 0.01 M. In this case, electrolyte salts will not decompose within the pores occupied by the filler material (and thus not occupied by electrolyte). This may help to minimize so-called formation losses (e.g., in Li-ion batteries) and increase the accessible cell energy density. Another desirable characteristic of the porous electrode filler material for most applications is electrochemical stability within the potential range of electrode operation. For example, if a filler is used in porous low potential anodes (e.g., with Si-comprising or C-comprising porous anode particles or other anodes comprising porous particles with alloying-type or conversion-type active materials) for Li-ion batteries, it may be desirable for the filler material to be stable within around 0.05-1.5 V vs. Li/Li+ because these anodes typically operate in this range during battery cycling. For other porous anodes, the desired stability range may be different—for example, from approximately 1.5 to approximately 2.0 V vs. Li/Li+ for LTO comprising anodes. For low voltage anode materials (for example, Si-comprising or C-comprising anodes or other anodes comprising alloying-type active materials), stability of the filler material towards reduction may be particularly important. In other electrodes that operate within 1.5-4.0 V, filler stability against both oxidation and reduction reactions may be important. In cathodes that operate within approximately 3-5.3 V vs. Li/Li+, filler stability against oxidation reactions may be more important. For example, if a filler is used in porous conversion-type cathodes (e.g., S-comprising or metal fluoride-comprising active materials) for Li-ion batteries, it may be desirable that it is stable against oxidation and reduction reactions taking place within approximately 1.7-3.9 V vs. Li/Li+. The particular stability range depends on the particular battery chemistry used in cell construction.

In general, liquid filler materials may be not substantially conductive with respect to electron transport (e.g., electrical conductivity less than 10'S/cm).

Several classes of materials may be suitable for use as liquid fillers for anodes in Li-ion and many other types of batteries. For example, hydrocarbons (including "regular," fluorinated, or sulfonated hydrocarbons—both aromatic and aliphatic) have been found to generally work well, particularly for Li-ion battery anodes. Examples of suitable hydrocarbons include, but are not limited to: (i) alkanes (including unbranched and branched isomers); (ii) cycloalkanes, including polycyclic (including isolated rings, spiro rings, and bridged rings); (iii) alkane-substituted compounds and aromatic hydrocarbons (arenes), including polycyclic compounds; as well as (iv) their mixtures.

In some applications, the filler material(s) may comprise organic or inorganic salts (e.g., Li, Na, or K salts) or select products of salt decompositions.

In contrast to the use of solid fillers, the use of liquid fillers may be more straightforward, more economical, provide more selectivity in filling different pores (e.g., pores of different sizes or pores of different chemistries) and, when liquid fillers remain liquid during cell operation, allow volume changes to be accommodated in active materials during cycling.

FIGS. 3A-3C show examples of suitable alkanes that may be used as filler material(s) or part of filler material(s). Other alkanes and their mixtures may also be used in some applications.

Examples of suitable cycloalkanes include, but are not limited to Cyclopropane (3 C), Cyclobutane (4 C), Cyclopentane (5 C), Cyclohexane (6 C), Cycloheptane (7 C), Cyclooctane (8 C), Cyclononane (9 C), Cyclodecane (10 C), and higher-order cycloalkanes.

Examples of suitable alkane-substituted compounds and aromatic hydrocarbons include, but are not limited to, Benzene, Alkane-substituted benzenes, Anthracene, Phenanthrene, Tetracene, Chrysene, Triphenylene, Pyrene, Pentacene, Benzo[a]pyrene, Corannulene, Benzo[ghi]perylene, Coronene, and Ovalene, to name a few.

In some applications, oils may be used as suitable fillers, particularly for porous anodes. Oils mostly consist of hydrocarbons but may have some oxygen groups, which may be partially reduced by chemical methods or be partially reduced during electrochemical cycling. However, since they are not miscible with electrolyte solvents and do not solvate electrolyte ions, they may be advantageously utilized as fillers as well. The price of the oils may be a consideration for the oil or filler selection. While expensive oils may, in principle, be used, they may undesirably increase the price of cells. Another consideration for the selection of oils is their availability. Many oils are not only pricey, but also not available in sufficiently large volumes. The use of low-cost, abundant oils as filler materials may be important from an economic perspective.

Examples of generally suitable oils (irrespective of the price and availability) include, but are not limited to: (i) vegetable oils (such as olive oil, canola oil, coconut oil, corn oil, cottonseed oil, palm oil, peanut oil, safflower oil, sesame oil, soybean oil, and sunflower oil, to name a few); (ii) nut oils (such as almond oil, beech nut oil, brazil nut oil, cashew oil, hazelnut oil, macadamia oil, mogongo nut oil, pecan oil, pine nut oil, pistachio oil, walnut oil, and others); (iii) citrus oils (such as grapefruit seed oil, lemon oil, and orange oil); (iv) various melon/gourd oils; (v) various food supplement oils; (vi) various other edible oils; (v) biofuel oils (such as castor oil, colza oil, mustard oil, radish oil, ramtil oil, salicornia oil, copaiba oil, jatropha oil, jojoba oil, milk bush, nahor oil, paradise oil, petroleum nut oil, pongamia oil, and others); and (vi) various drying oils (such as dammar oil, linseed oil, stillingia oil, and vernonia oil); and various other oils.

Oils can be used in a native state (as mentioned above) or chemically modified. One useful modification is the hydrogenation of oils, where available C=C double bonds present in the oils structure are saturated by hydrogenation. Such oils become particularly useful for anodes because they are more stable against reduction at low potentials. Similar modifications may be conducted on hydrocarbons having C=C double bonds.

Another potentially useful chemical modification is fluorination of oils and hydrocarbons. This process increases oxidation stability and makes a broader range of oils and hydrocarbons suitable for fillers in porous cathode materials (including conversion-type cathode materials for Li-ion and Li batteries). However, this process may reduce reduction stability of these filler materials and make them less useful in some of the anode applications.

In some applications, filler materials may comprise about 0.01-100 wt. % ionic liquids (including poly(ionic liquids)) with neutral, acidic, or caustic pH.

In some applications, filler materials may comprise a solid electrolyte (including but not limited to solid ceramic electrolytes, gel electrolytes, etc.) compatible with a liquid electrolyte used in a corresponding cell.

In some applications it may be advantageous to use liquid fillers that may be transformed into solid filler materials. One route to achieve this goal is to utilize "reactive" fillers that physically or chemically transform from one form or state to another.

Several suitable "reactive" fillers may be used. One illustrative example is the broad class of monomers that can be infiltrated into the pores from a liquid or vapor phase and polymerized. After such a polymerization reaction, a thin film or a gel may be formed within the pores. Such a solid filler may be stable against dissolution in the electrolyte and may not be permeable to electrolyte salt molecules, which may be advantageous for reducing the irreversible "formation" losses in cells or for mitigating other undesirable reactions between the active material and electrolyte (for example, dissolution of the active material or electrolyte decomposition, etc.). In some configurations, this process may also be used on individual porous particles prior to their assembling into the electrode. In this case the polymerized monomer may also protect the active material from undesirable reactions with the ambient environment (for example, from a reaction with binder solvent if such a solvent is used for electrode formulation or from a reaction with air during powder handling outside of the controlled atmosphere environment, etc.). It may be desirable for the polymer not to be soluble in the solvent used for electrode fabrication. In some applications it may be desirable for the polymerized filler not to be reduced or oxidized during electrochemical cycling in cells.

Several classes of suitable reactive fillers may be used, including, but not limited to: (i) monomers that may be polymerized in the particle pores; (ii) polymer precursors (such as reactive oligomers); and (iii) chemically modified oils, to name a few examples.

Examples of suitable monomers (as reactive fillers) include, but are not limited to: (i) styrene based monomers with admixture of bifunctional vinyl monomers for cross-linking (such as divinylbensene, diacrylates, dimethacrylates, etc.); (ii) vinylcarbonate based monomers with admixture of bifunctional vinyl monomers for cross-linking (such as divinylbensene, diacrylates, dimethacrylates, etc.); (iii) divinylbenzene (which is a heat curable hydrocarbon-like monomer; functionalized divinyl benzene can be used to further tune the properties of the coating in the pores); and others. It may be useful for the polymer precursors to be sufficiently small to effectively infiltrate into the pores (which, of course, depends on the pore size distribution of the porous electrode particles). Examples of suitable polymer precursors include, but are not limited to: (i) a broad range of silicone precursors (which may be heat cured)—in general, silicones are soft and chemically stable materials suitable for pore filling; (ii) poly(ethylene oxide) (PEO) precursors; (iii) poly(propylene oxide) (PPO) precursors; and (iv) various block co-polymer precursors (such as precursors of block co-polymers of PEO and PPO), to name a few. Other suitable polymer precursors include monomers capable of forming a polymer either by a chain growth or step growth mechanism. The first group comprises alkene (vinyl polymers) or alicyclic compounds (polymerizable via ring-opening polymerization). Examples include but are not limited to ethylene derivatives, acrylates, methacrylates, vinyl alcohol ethers and esters, styrene like monomers, and vinyl halogenides, to mention a few. Step growth polymer precursors can be used as well. Examples include but are not limited to the following polymer classes: polyesters, polyethers, polyurethanes, polyureas, polyamides, polyketones, and polysulfides, to mention a few. It may be preferable for the polymer filler not to be swellable in electrolyte solvent. Therefore, a particular chemistry for the polymer precursor of choice may depend on the electrolyte used for the specific battery construction. Similarly, it may be preferable for the polymer filler to be electrochemically stable during cell operation. Therefore, a particular chemistry for the polymer precursor of choice may also depend on the battery chemistry and the potential range to which polymer-filled porous electrode particles are exposed during battery cycling.

One example of a suitable modification of oils that makes them reactive is epoxidation of the C=C double bonds, forming epoxy groups capable of thermal, catalytic, or ultra violet (UV) cross-linking. Similar modifications may be conducted on hydrocarbons having C=C double bonds.

In some special cases (for example, when formation losses may be compensated or when filler ionic conductivity is important), it may be advantageous to utilize fillers that become reduced (e.g., in the case of anode fillers) or oxidized (e.g., in the case of cathode fillers) during the cell "formation" cycles. Furthermore, in some applications such a filler in the initial (e.g., liquid) material may be permeable to electrolyte ions or swellable in electrolyte solvent. In this case, the formation cycle of the filled nanoporous electrode particles may form an ionicaly conductive "synthetic" solid electrolyte interphase (SEI) layer inside the pores after the filler is electrochemically transformed (e.g., reduced) during the cell "formation" cycles and becomes a solid ionic conductor.

Examples of suitable fillers for this "synthetic SEI" may include, but are not limited to: (i) polyethers; (ii) polyesters; (iii) polymers based on derivatives of acrylic or methacrylic acids (esters and amides); and so on. Some of these fillers may also comprise salts (e.g., Li salts for Li ion batteries or Na salts for Na ion batteries).

Ethers may form a good SEI on the surface of many anode materials, including those used for Li-ion batteries, such as Si, Sn, and others. Polyethers with a hydrophobic part may be particularly useful in some applications as "synthetic SEI" forming fillers. A portion of the polyether may be transformed into this SEI upon the initial (formation) cycles, whereas another hydrophobic part may remain intact. Polyethylene glycol is an example of such a polyether.

Polymer derivatives of acrylic or methacrylic acids may be polymerized in the presence of bifunctional vinyl monomers, thus transforming into insoluble (in battery solvents) copolymers.

In some applications, it may be advantageous to use solid fillers. For example, polymers with various molecular weights (MW) may be utilized to fill pores of different sizes. The use of larger MW polymers may be used to "seal" porous particles with a conformal layer of a polymer filler. In some applications, it may also be advantageous to use oligomers.

In some applications, it may also be advantageous to use metallic fillers (when good electrical conductivity is desired).

In some applications, it may also be advantageous to use ceramic fillers (e.g., as (nano)particles or coatings). Illustrative examples of suitable ceramic fillers include, but are not limited to, various oxides (e.g., $Li_2O$, $Al_2O_3$, $MgO$, etc.), fluorides (e.g., $LiF$, $NaF$, $AlF_3$, etc.), and other suitable ceramic materials.

In some applications, it may also be advantageous for a filler material to comprise electrically conductive carbon (e.g., amorphous carbon, carbon nanofibers, carbon nanotubes (CNT), short (e.g., from 0.001 to 1 micron) CNT segments, carbon nanoparticles, graphene segments, graphite ribbons, carbon onions, carbon black, etc.). The size of the carbon particles may preferably be made sufficiently small in order to be inserted into the target pores of the porous particles (e.g., the diameter of the CNTs should preferably be smaller than half of the pore width).

In some applications, it may be advantageous to use chemical vapor deposition (CVD) (including chemical vapor infiltration and other CVD methods), atomic layer deposition, layer-by-layer deposition, suspension infiltration, sol-gel synthesis, melt-infiltration, and other methods for infiltration of solid filler materials.

In some applications, it may be advantageous to use a mixture of suitable fillers or several different fillers. For example, different fillers may be used with each having its own molecular size (and interaction energy with pore walls) in order to fill pores of a desired size and shape. It may also be advantageous to use a combination of reactive and non-reactive fillers. It may also be advantageous to use a mixture of solid and liquid fillers (e.g., a mixture of hydrocarbons with oligomers, polymers, salts, ceramic particles, metal, carbon, etc.).

FIG. 4A shows an example of a suitable method for the fabrication of an electrochemical energy storage device (e.g., a battery) with at least one electrode, which comprises porous active material-comprising particles, but which also minimizes undesirable interactions between the electrolyte and the internal surface of the active material particles. The particles may be provided or produced in various ways (block 402) and so too can the filler material (block 404).

According to this method an electrode with suitable porous particles (for example, particles with open pores in the range from 0.4 nm to 200 nm) may be first infiltrated with a suitable filler material (block 406). Such an infiltration process may involve infiltration in a gaseous phase (e.g., vapor infiltration or as chemical vapor deposition of a suitable filler) or in a liquid phase (e.g., by immersing into a suitable filler solution). This process may proceed at room temperature (for example, at around +20° C.) or elevated temperatures (for example, from +20 to +400° C.) or even at reduced temperatures (for example, from −100 to +20° C.). Higher temperatures may be utilized in order to improve diffusion of the filler material into the pores or in order to melt or soften a solid filler material. Lower temperatures may be utilized, for example, in order to reduce filler vapor pressure or reactivity, or to control other properties. The infiltration pressure may be low (for example, from 0.01 Torr to 759 Torr), atmospheric (around 760 Torr), or high (for example, from 760 to 76,000 Torr). Lower pressures may allow more uniform infiltration of the filler material into the smallest pores (particularly if the infiltration takes place in the gas phase). The electrode may also be exposed to vacuum (reduced pressure) or heat before the filler is infiltrated into the pores in order to extract undesirable adsorbates from their pores. High pressure may also be used in order to force filler into the pores or, for example, in order to liquefy fillers (for example, before their transformation), or for other technical or economic reasons.

Once the filler material is infiltrated into the pores, excess of the filler (for example, from the outer surface of the porous particles) may be removed (for example, by heating, by application of vacuum, or by other suitable methods) (optional block 408). The filler material may also be further be modified (for example, cross-linked, polymerized, or reduced, etc.) in order to change its properties (optional block 410). The cell may then be assembled using the produced electrodes with particles comprising pores at least partially filled with suitable filler materials (block 412).

FIG. 4B shows an example of another suitable method for the fabrication of an electrochemical energy storage device (e.g., a battery) with at least one electrode comprising porous active material-comprising particles. The particles may again be provided or produced in various ways (block 452) and so too can the filler material (block 454).

According to this method a suitable filler material may be first infiltrated into individual suitable electrode particles (or agglomerations of particles) (block 456). A suitable range of open pores in these porous particles may generally range from around 0.4 nm to around 200 nm, although particles with open pores outside of this range may also be used. This process may proceed at room temperature (for example, at around +20° C.) or elevated temperatures (for example, from +20 to +400° C.) or even at reduced temperatures (for example, from −100 to +20° C.). The infiltration pressure may be low (for example, from 0.01 Torr to 759 Torr), atmospheric (around 760 Torr), or high (for example, from 760 to 76,000 Torr). The porous electrode particles may also be exposed to vacuum (reduced pressure) or heat before the filler is infiltrated into the pores (or during the infiltration) in order to extract undesirable adsorbates from their pores before the infiltration. High pressure may also be used.

Once the filler material is infiltrated into the pores, excess of the filler (for example, from the outer surface of the porous particles) may be removed (for example, by heating, by application of vacuum, or by other suitable methods) (optional block 458). The filler material may further be modified (for example, cross-linked, polymerized, or reduced, etc.) in order to change its properties (optional block 460). The electrode may be prepared using the porous particles with pores at least partially filled with the filler (block 462). The electrode may comprise a binder, conductive additives, and a current collector. The cell may then be assembled using the produced electrodes (block 464).

Figure 4C:
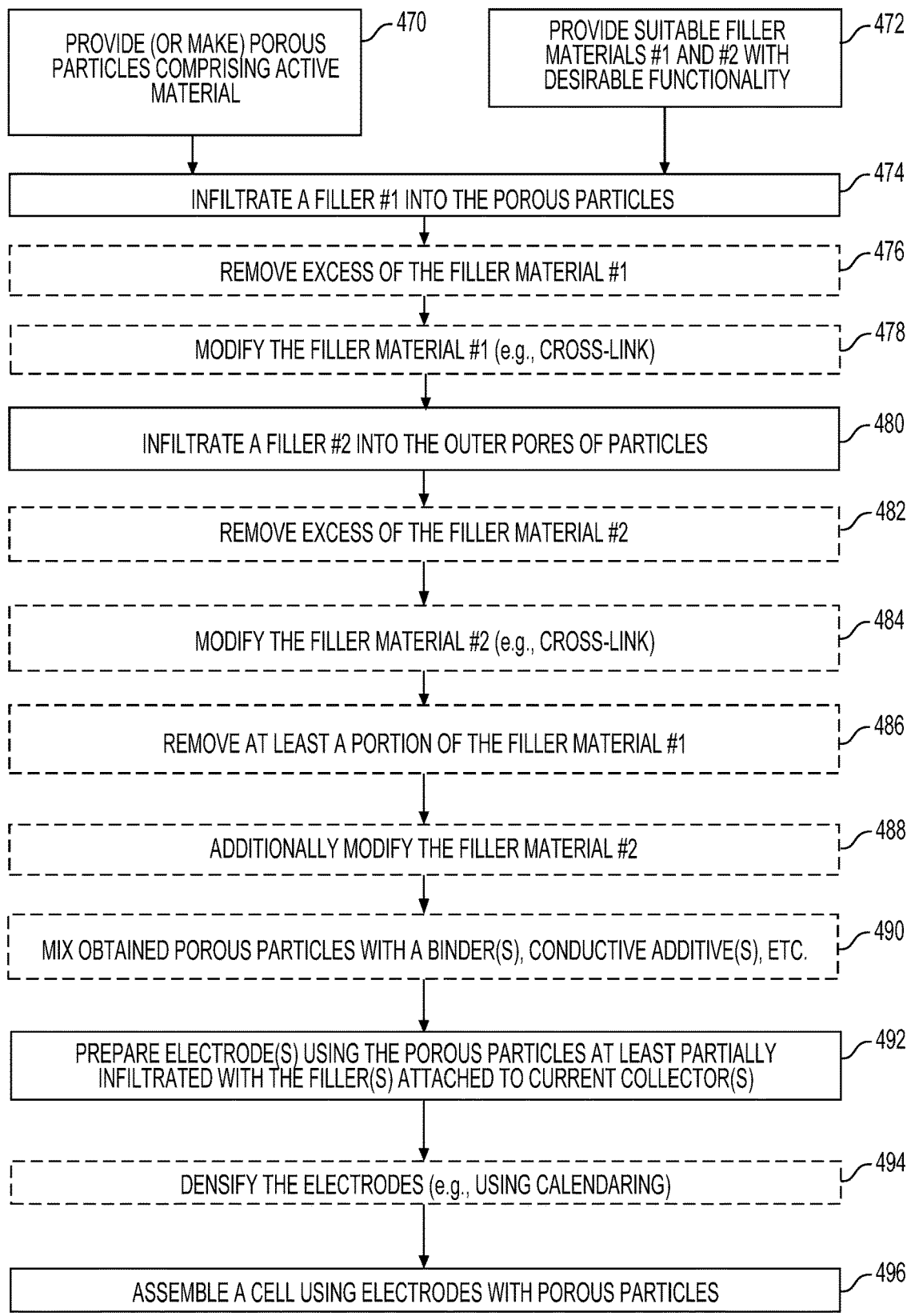

FIG. 4C shows an example of another suitable method for the fabrication of an electrochemical energy storage device (e.g., a battery) with at least one electrode comprising porous active material-comprising particles and more than one filler material (e.g., filler material #1, #2, #3, etc.). The particles may again be provided or produced in various ways (block 470) and so too can the filler materials (block 472).

According to this method two or more suitable filler materials are provided. A filler #1 may be first infiltrated into individual suitable electrode particles (or agglomerations of particles) (block 474) and any excess of the filler #1 material may be optionally removed (optional block 476). After optional modification of the filler #1 material (optional block 478), the particles may be infiltrated with a second filler material (filler #2) (block 480).

After an optional removal of any excess of the filler #2 material (optional block 482), after an optional modification of the filler #2 material (optional block 484), and after an optional removal of at least an additional portion of the filler #1 (optional block 486), an additional modification of the filler #2 may be optionally performed (e.g., to close the pores, apply a heat-treatment, or transform the material, such as via chemical reaction, etc.) (optional block 488). An additional filler (e.g., filler #3) may be optionally applied as well (not shown).

The obtained porous particles may be mixed with one or more binders, conduct additives, etc., as desired (optional block 490 and the electrode may then be prepared using the porous particles with pores at least partially filled with the filler or a combination of fillers (block 492). The electrode may be optionally calendered (densified) (optional block 494). The cell may then be assembled using the produced electrodes (block 496).

In some applications it may be advantageous to utilize porous electrode particles comprising a certain distribution of pore sizes within each particle in order to fill only a portion of the pores with suitable filler(s), while closing the other (for example, larger) pores from direct interactions with the ambient environment or the electrolyte during electrochemical cycling in devices. Similarly, it may be advantageous for the porous particles to exhibit different chemistries or surface functionalization (or surface coatings) in order to selectively fill a desired portion of the porous particles with suitable filler(s), while retaining (e.g., closed) porosity in some portion of the particles.

FIG. 5A is a graphical flow diagram illustrating an example of one such advanced particle design and fabrication method thereof. In this example, the particle comprises an outer portion 502 and an inner portion 504. As shown, the outer portion 502 of the particle comprises smaller pores or a different chemistry, which may be selectively filled with a suitable filler 506, thus encasing (closing) the inner (e.g., larger) pores in the inner portion 504 of such particles. As an example, the outer portion may have an average pore size that is less than about 1 nm and the inner portion may have an average pore size that is greater than about 3 nm.

In this example, the inner portion of the particle is shown to be completely unfilled and the filler in the outer portion of the particle is shown to enclose the inner portion (which may be alternatively referred to as the porous particle core). However, it will be appreciated that the inner portion of the particle may be partially filled and that multiple unfilled porous areas may exist in a given particle. In either case, a prominent feature of this porous particle-filler composite architecture is that the filler closes some of the pores (which may be open if no filler is used). The presence of empty (or incompletely filled) pores in such particles that are protected from the electrolyte or environment may be advantageous in some applications. For example, when an alloying-type or conversion-type active material expands, empty pore volume may accommodate such an expansion without having to squeeze the filler out of the particles or without excessive particle expansion.

The selectivity of different pores to filling may be achieved by different routes. In one example, the pores in the outer (or, more generally, to be filled) portion of the particles may exhibit stronger interactions with the filler material (for example, because of their smaller size the interaction potentials from the pore walls and the filler molecules may overlap leading to stronger adhesion). Selectivity, in this case, may be achieved by controlling the sealing pressure or temperature (for example, selecting conditions when filler only adsorbs into the stronger interacting pores). In another example, the pores in the outer portion of the particles may be so small that they become effectively clogged by larger molecules of one filler. To complete or improve the "sealing" process, the smaller molecules of another suitable filler may be used to fill the remaining pores in the outer portion of the particles. In yet another example, the surface of the pores in the outer portion of the particles may be more reactive (for example, containing functional groups or species capable of transforming the filler molecular weight or phase). If needed, any excess of the filler material from the inner pores may be removed (for example, by exposure to elevated temperature or vacuum or by other methods).

FIG. 5B is a graphical flow diagram illustrating another example of a particle having some pores filled with a suitable filler material 506, some pores at least partially unfilled and closed (protected) from direct interactions with the electrolyte or ambient environment, and some outer pores remaining empty and open for interactions with either a binder or electrolyte.

The produced particles may also be infiltrated with a second filler 508, while the first filler 506 may be (optionally) removed. This porous particle-filler architecture may be advantageous in some applications. For example, it may allow easier slurry formulation (better dispersion) for the electrode preparation, stronger adhesion to the electrode binder, stronger adhesion to the SEI layer on the outer surface of the particles, or provide other benefits.

FIG. 5C is a graphical flow diagram illustrating an example of a particle having a gradient in properties (e.g., in pore size, pore shape, pore volume, microstructure, etc.) or in composition (e.g., chemistry or surface chemistry) from the center to the surface of the porous particles. As such, a suitable filler material 506 is also not distributed uniformly within these porous particles, but rather creates a gradient (from the center to the surface of the porous particles) in the volume fraction of the particle occupied by the filler. Some of the pores (e.g., closed or open pores) may remain empty.

FIG. 5D is a graphical flow diagram illustrating another example of a porous composite particle filled with a filler material 506, where a portion (e.g., excess) of the filler material is (optionally) removed after infiltration (e.g., by evaporation).

FIG. 5E is a graphical flow diagram illustrating another example of a porous composite particle filled with a filler material 506, where the small size of the outer pores 510 prevents the filler material from accessing some of the inner pores. As a result, the filler material forms a conformal coating around the porous particles. The chemistry, microstructure, or other properties of such a filler coating may be further modified after formation.

In addition to (or even instead of) preventing electrolyte decomposition onto the internal pore surface, filler materials may be used for other purposes (functions).

In one example, the filler material may comprise a marker (or a combination of markers) that help(s) to distinguish one product (electrode powder) from another (including the one extracted from the assembled and/or cycled cells). The utility of this approach for commercial applications may include: (i) the ability to charge different customers (or the same customer for different applications) different prices for the same or similar products; (ii) the ability to identify and eventually prevent unauthorized use of the product; and (iii) the ability to identify illegal replica of the products, to name a few. Such markers may preferably be stable during cell operation. Illustrative examples of such markers may include organic or inorganic molecules (e.g., salts, dyes, olygomers, polymers, quantum dots, etc.), nanoparticles, unique isotopes, or other species that exhibit strong spectroscopic or spectrometric signals (detectable by and quantifiable, for example, Raman spectroscopy, Fourier transform infrared (FTIR) spectroscopy, energy dispersive X-ray spectroscopy (EDS), secondary emission mass spectrometry (SIMS), fluorescence, nuclear magnetic resonance (NMR) spectroscopy, X-ray photoelectron spectroscopy, isotope-ratio mass spectrometry (IRMS), and other techniques), stable during cell operation, easily distinguished from that of the rest of the composite porous particle composition and, preferably, from the electrolyte and SEI species.

In another example, the filler material may comprise SEI-forming additives that allow more stable SEI formation and better cell stability.

In yet another example, the filler material may comprise species that neutralize harmful components in the electrolyte (that may either be initially present or formed during cycling, such as acids, certain metal ions, etc.).

The porous particles may be of any shape (e.g., near-spherical, cylindrical, plate-like, have a random shape, etc.) and of any size. The maximum size of the particle may depend on the rate performance requirements, on the rate of the ion diffusion into the partially filled particles, and on other parameters. In most cases, though, the smallest particle dimensions (e.g., thickness in the case of flake-shaped particles or diameter in the case of spherical particles) may range from around 20 nm to around 50 microns.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A first battery electrode composition, comprising:
   a first composite particle comprising a first porous electrode particle, a first active material capable of storing and releasing ions during battery operation, and a first filler material occupying at least a portion of one or more pores of the first porous electrode particle,
   wherein the first filler material is not substantially conductive with respect to electron transport, and
   wherein the first filler material comprises one or more markers, the one or more markers capable of distinguishing the first filler material of the first battery electrode composition from one or more other filler materials of one or more other battery electrode compositions via respective spectroscopic or spectrometric signals.

2. A battery electrode composition arrangement, comprising:
   the first battery electrode composition of claim 1; and
   a second battery electrode composition comprising a second composite particle, the second composite particle comprising a second porous electrode particle, a second active material capable of storing and releasing ions during battery operation, and a second filler material occupying at least a portion of one or more pores of the second porous electrode particle,
   wherein the second filler material comprises at least one marker, the one or more markers of the first filler material being distinguishable from the at least one marker of the second filler material via the respective spectroscopic or spectrometric signals.

3. The battery electrode composition arrangement of claim 2, wherein the first active material of the first battery electrode composition is the same as the second active material of the second battery electrode composition.

4. The battery electrode composition arrangement of claim 2, wherein the first active material of the first battery electrode composition is different than the second active material of the second battery electrode composition.

5. The first battery electrode composition of claim 1, wherein the first filler material is configured to substantially prevent direct contact between the first active material and at least one component of an electrolyte capable of being used in a battery cell once the first battery electrode composition is made part of an electrode of the battery cell.

6. The first battery electrode composition of claim 5, wherein the at least one component comprises an electrolyte solvent.

7. The first battery electrode composition of claim 1, wherein the spectroscopic or spectrometric signals are detectable by Raman spectroscopy, Fourier transform infrared (FTIR) spectroscopy, energy dispersive X-ray spectroscopy (EDS), secondary emission mass spectrometry (SIMS), fluorescence, nuclear magnetic resonance (NMR) spectroscopy, X-ray photoelectron spectroscopy, isotope-ratio mass spectrometry (IRMS), or any combination thereof.

8. The first battery electrode composition of claim 1, wherein the one or more markers comprise one or more salts, one or more dyes, one or more oligomers, one or more polymers, one or more quantum dots, one or more nanoparticles, or any combination thereof.

9. The first battery electrode composition of claim 1, wherein the one or more markers are stable during battery operation.

10. The first battery electrode composition of claim 1, wherein the first filler material exhibits an electrical conductivity of less than about $10^{-6}$ S/cm.

11. The first battery electrode composition of claim 1, wherein the first active material comprises silicon.

12. The first battery electrode composition of claim 1, wherein the first active material comprises a metal-fluoride-based material.

13. The first battery electrode composition of claim 1, wherein the first porous electrode particle exhibits a porosity in the range from about 2 vol. % to about 70 vol. %.

14. The first battery electrode composition of claim 1, wherein the first porous electrode particle exhibits a specific surface area in the range from about 5 $m^2/g$ to about 3000 $m^2/g$.

15. The first battery electrode composition of claim 1, wherein the first porous electrode particle exhibits pore dimensions in the range from about 0.4 nm to about 40 nm.

16. The first battery electrode composition of claim 1, wherein the first porous electrode particle comprises conductive carbon.

17. The first battery electrode composition of claim 1, wherein the first filler material is at least partially fluorinated or sulfonated.

18. The first battery electrode composition of claim 1, wherein the first filler material comprises a Li salt.

* * * * *